United States Patent [19]

Honda

[11] Patent Number: 5,799,974
[45] Date of Patent: Sep. 1, 1998

[54] VEHICLE AIR BAG SYSTEM

[75] Inventor: Kiyoshi Honda, Saitama-ken, Japan

[73] Assignee: Honda Giken Kogyo Kabushiki Kaisha, Tokyo, Japan

[21] Appl. No.: 754,620

[22] Filed: Nov. 21, 1996

[30] Foreign Application Priority Data

Nov. 24, 1995 [JP] Japan .................. 7-329759

[51] Int. Cl.$^6$ .................................................. B60R 21/28
[52] U.S. Cl. ............................. 280/739; 280/728.2
[58] Field of Search .......................... 280/728.2, 731, 280/736, 738, 739, 741, 742

[56] References Cited

U.S. PATENT DOCUMENTS

| | | | |
|---|---|---|---|
| 3,778,083 | 12/1973 | Hamasaki | 280/739 |
| 5,186,489 | 2/1993 | Imai | 280/743.2 |
| 5,234,229 | 8/1993 | Gordon | 280/736 |

*Primary Examiner*—Paul N. Dickson
*Attorney, Agent, or Firm*—Armstrong, Westerman, Hattori, McLeland & Naughton

[57] ABSTRACT

In a vehicle air bag system for restraining a vehicle occupant under a high deceleration situation, a retainer for retaining the air bag is provided with vent holes, and an inflator for inflating the air bag is initially placed over the vent holes. The inflator is attached to the retainer or to the air bag via a flexible member so that as the air bag is deployed, the inflator is lifted away from the vent holes, thereby allowing the gas inside the air bag to be expelled. Thus, the air bag is not required to be provided with an opening for deflating the air bag after restraining the vehicle occupant, and the produced gas can be efficiently used for inflating the air bag. Because the vent holes are formed in the fixed retainer, and its effective size remains fixed, as opposed to the case of forming a vent hole in the air bag itself, it is possible to control the time sequence of inflating and deflating the air bag in a highly accurate manner.

12 Claims, 11 Drawing Sheets

VEHICLE AIR BAG SYSTEM

TECHNICAL FIELD

The present invention relates to a vehicle air bag system for restraining a vehicle occupant at the time of a vehicle crash and other high deceleration situations and, in particular, to an improved arrangement for a vehicle air bag system.

BACKGROUND OF THE INVENTION

To protect a vehicle occupant from the impact of a vehicle crash, air bag systems are increasingly widely installed in motor vehicles. Typically, such an air bag system is incorporated with an air bag, and an inflator for producing the gas required for inflating the air bag. The air bag is compactly folded and stowed in the center of the steering wheel, or in the dashboard, which is located immediately in front of the vehicle occupant. Once the air bag is deployed and has successfully restrained the vehicle occupant, it is immediately deflated so that the vehicle occupant may not be excessively thrown back, and may be allowed to promptly evacuate from the vehicle. Conventionally, a relatively large vent opening is provided in the bag itself so that the air bag may be deflated immediately after the propellant in the inflator is all burnt up. The position of such a vent opening is selected so that the vented gas is not directly blown onto the vehicle occupant.

However, such a vent opening causes a substantial amount of gas leakage as soon as the air bag starts to be inflated, and the inflator therefore has to be increased in capacity so as to make up for such a leakage of gas.

Also, because the vent opening is provided in a flexible fabric material, which was initially folded up, the shape of the vent opening is highly unpredictable, particularly, in an early stage of inflation, and the inflating property of the air bag tends to be highly unstable. Therefore, a large number of tests have to be conducted before deciding on the final specifications of the air bag system, and this means a need for a substantial amount of additional cost for developing the air bag system.

BRIEF SUMMARY OF THE INVENTION

In view of such problems of the prior art, a primary object of the present invention is to provide a vehicle air bag system which can quickly deflate the air bag immediately after full deployment of the air bag in a highly controlled time sequence.

A second object of the present invention is to provide a vehicle air bag system which can minimize the loss of the gas which is used for inflating the air bag.

A third object of the present invention is to provide a vehicle air bag system which can be readily adapted to various specifications, and can thereby reduce the cost for development.

A fourth object of the present invention is to provide a vehicle air bag system which is simple in structure, and is economical to manufacture.

These and other objects of the present invention can be accomplished by providing a vehicle air bag system for restraining a vehicle occupant under a high deceleration situation, comprising: an air bag adapted to be inflated by gas pressure; a retainer for supporting the air bag, the retainer defining an enclosed space jointly with the air bag, and provided with a vent hole for communicating said

2 enclosed space with outside; an inflator received in the enclosed space for producing gas for inflating and deploying the air bag; means for disposing the inflator over the vent hole so as to substantially close the vent hole; and means for removing the inflator away from the vent hole at a relatively late stage of air bag deployment.

Thus, the air bag is not required to be provided with an opening for deflating the air bag after restraining the vehicle occupant, and the produced gas can be efficiently used for inflating the air bag. Because the vent hole is formed in the fixed retainer, and its effective size remains fixed, as opposed to the case of forming a vent hole in the air bag itself, it is possible to control the time sequence of inflating and deflating the air bag in a highly accurate manner.

By connecting tie strings between parts of the air bag and the retainer, it is possible to control the shape of the air bag in its fully deployed state. In this case, the inflator can be attached to the tie strings to move the inflator away from the vent hole as the air bag is deployed. According to a preferred embodiment of the present invention, the inflator is pushed against the vent hole by interposing the air bag in a folded state between the inflator and a casing covering the folded air bag. Typically, the casing is provided with a rupture line which is adapted to rupture at a relatively early stage of air bag deployment. It is also possible to use other means for lightly securing the inflator against the vent hole under normal conditions which allow the inflator to be freely moved away when any such external force is applied thereto.

To allow the inflator to be moved away from the vent hole as the air bag is deployed, the inflator may be attached to the retainer or to the air bag itself via a flexible member. Preferably, the inflator is received in an air-permeable flexible bag, for instance made of porous but durable fabric, so as to simplify the arrangement for attaching the inflator to the tie strings, to the retainer or to the air bag without hindering the gas issuing from the inflator passing through the flexible bag and being introduced into the air bag. In this case, the flexible bag itself may also serve as a flexible member directly joining the inflator to the corresponding object.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
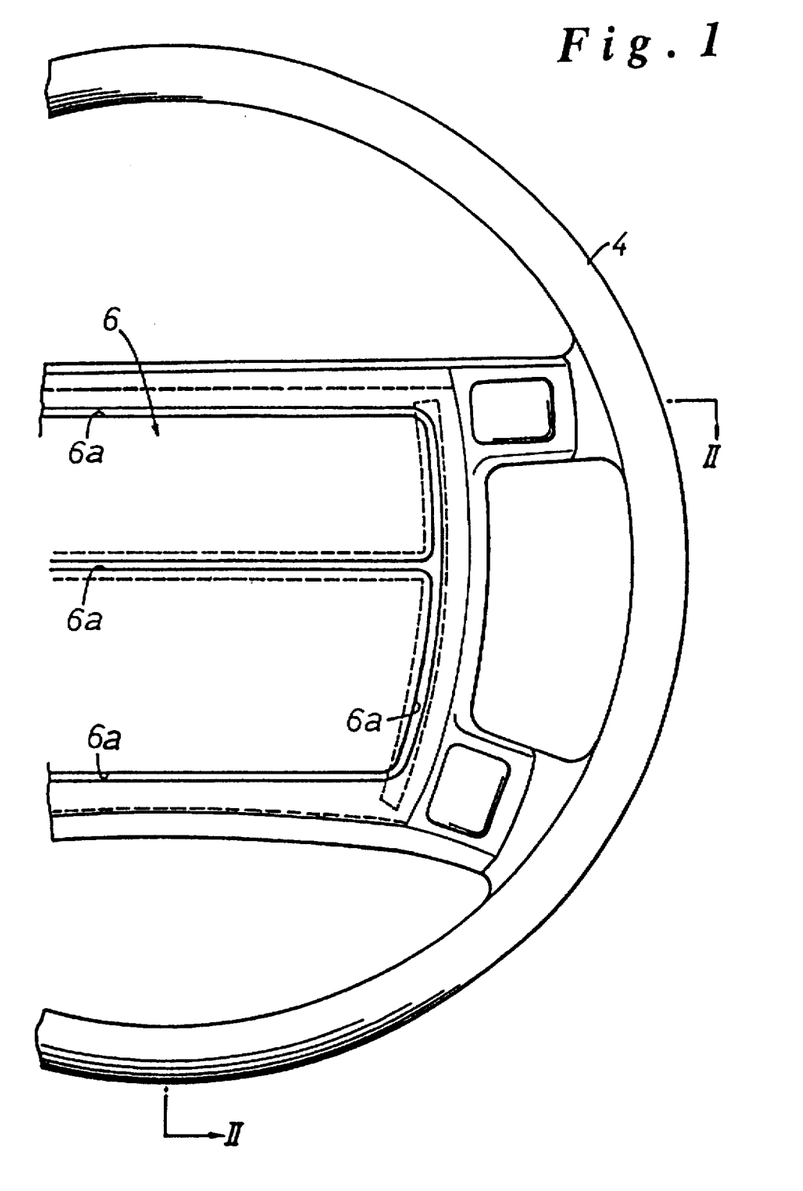
FIG. 1 is a front view of a steering wheel incorporated with a vehicle air bag system according to the present invention.
Figure 2:
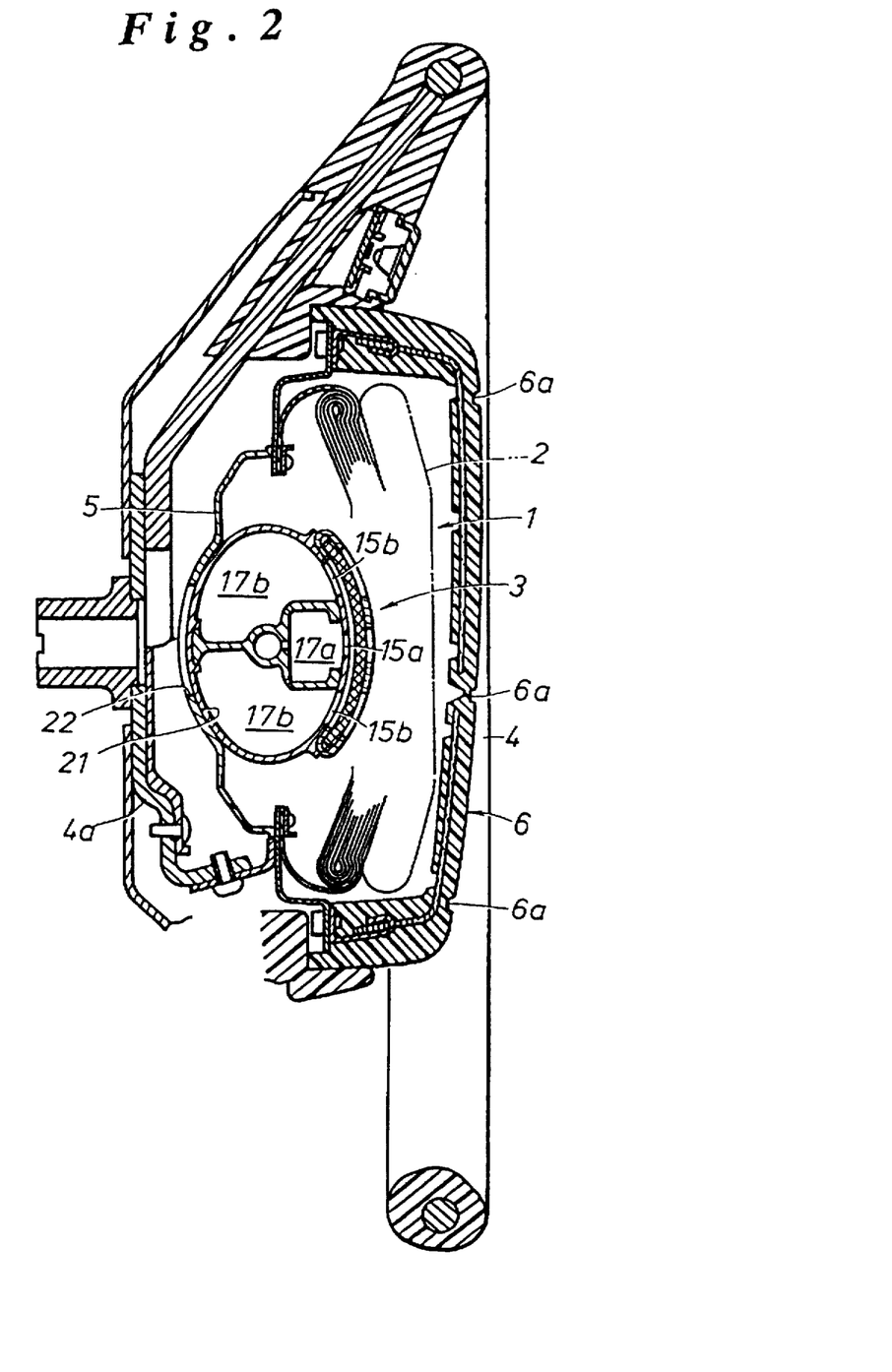
FIG. 2 is a sectional view taken along line II—II of FIG. 2.

FIGS. 1 and 2 show a steering wheel incorporated with a vehicle air bag system according to the present invention. This air bag system 1 comprises an air bag 2 made of nylon fabric lined with neoprene, and an inflator 3 for producing the gas required to inflate the air bag 2. This assembly is supported by a dish-shaped retainer 5 which is fixedly secured to a center hub 4a of the steering wheel 4. The retainer 5 defines an enclosed space jointly with the air bag 2, and the inflator 3 is received inside this enclosed space. The bottom surface of the retainer 5 is provided with a concave recess 21 for receiving the inflator 3 therein, and vent holes 22 are provided in the bottom end of this recess 21.

The air bag 2 in its folded state is covered by a casing 6 which also serves as a center pad for the steering wheel 4. The peripheral part of the casing 6 is attached to the retainer 5, and the air bag 2 is relatively tightly interposed between the casing 6 and the retainer 5. The casing 6 is made of a relatively rigid urethane resin, and is provided with a linear thin walled portion 6a on a front wall thereof for allowing the casing 6 to be ruptured along a prescribed line when the air bag 2 is deployed.

Figure 3:
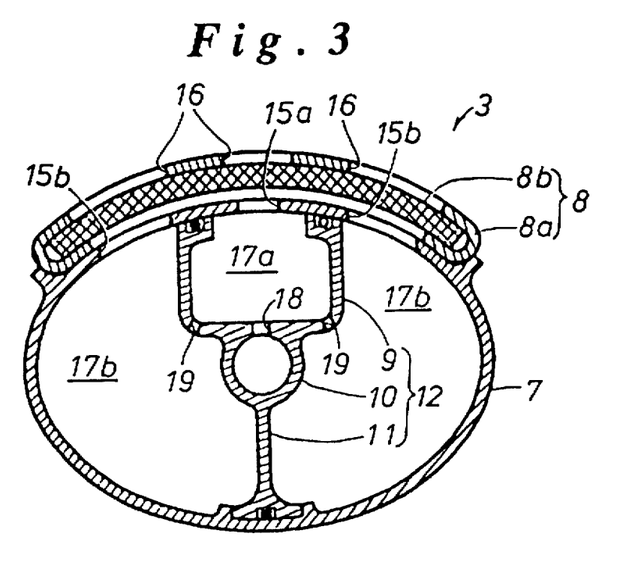
FIG. 3 is a cross sectional view of the inflator.
Figure 4:
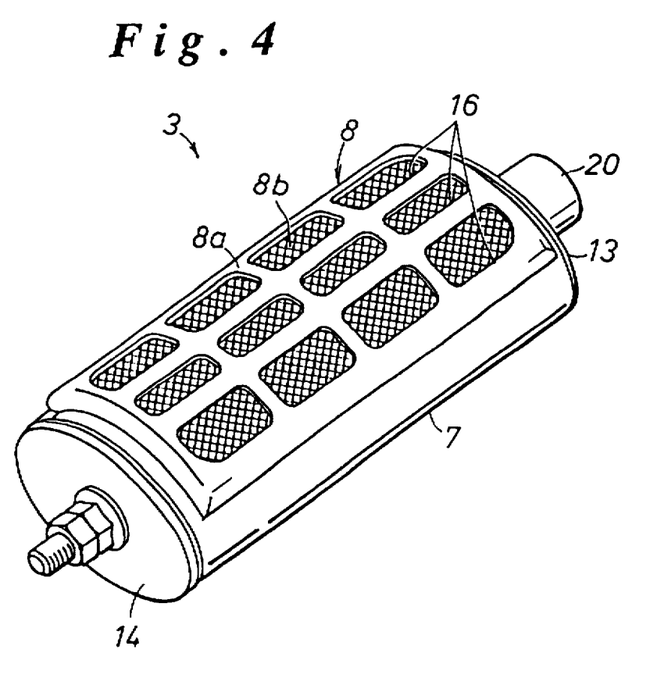
FIG. 4 is a perspective view of the inflator.
Figure 5:
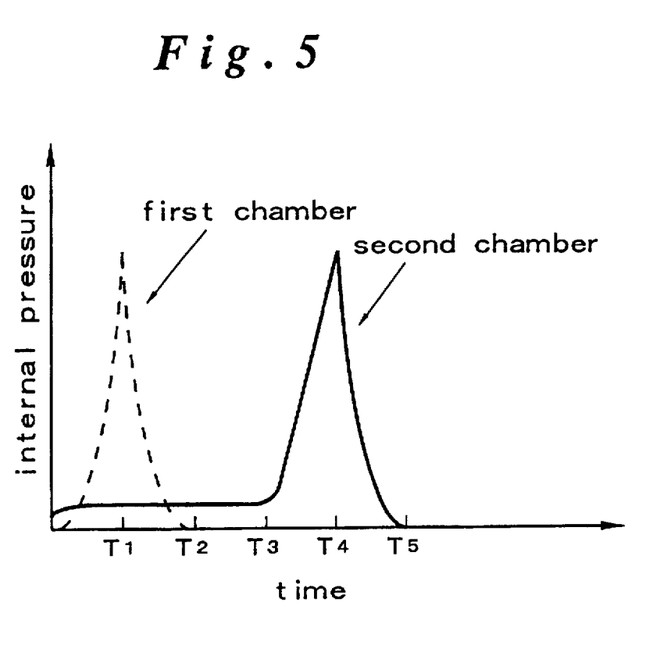
FIG. 5 is a time-pressure diagram of the inflator.

Referring to FIGS. 3 and 4, the inflator 3 comprises a housing main body 7 made of an aluminum alloy, hollow extruded member having an elliptic cross section, a filter assembly 8 attached to an outer surface of the housing main body 7, a partition wall 9 separating the interior of the housing main body 7 into a first combustion chamber 17a and a second combustion chamber 17b, an ignition pipe 10 extending centrally and axially inside the housing main body 7 and integrally formed with the partition wall 9, a leg section 11 which is integrally formed with the ignition pipe 10 at its one end, and separates the second combustion chamber 17b into two equal parts, a bottom plate 13 fixedly attached to one of the axial ends of the housing main body 7, and a lid plate 14 fixedly attached to the other axial end of the housing main body 7. The partition wall 9, the ignition pipe 10, and the leg section 11 consist of a common single extruded member which is attached to the inner surface of the housing main body 7 by brazing.

A plurality of gas ejection holes 15 are formed on one side of the housing main body having a relatively small curvature in three axial rows, and the gas ejection holes 15a of the central row may be circular in shape while the gas ejection holes 15b of the outer rows may be laterally elongated in shape.

The filter assembly 8 comprises a filter element 8b consisting of a plurality of layers of wire mesh having different properties, and a frame member 8a retaining the filter element 8b, and covers the region of the surface of the housing main body in which the gas ejection holes 15 are formed. The frame member 8a is provided with twelve rectangular openings 18 in three axial rows so as to correspond to the underlying gas ejection holes 15.

The partition wall 9 has a C-shaped cross section with its open end attached to the inner surface of the housing main body 7 in such a manner that the gas ejection holes 15 of the central row are communicated with the first combustion chamber 17a while the second combustion chamber 17b is communicated with the gas ejection holes 15b of the outer rows. The ignition pipe 10 is provided with a row of axial holes 18 directed to the interior of the first combustion chamber 17a, and receives therein an igniter which is not shown in the drawings. Thus, when the igniter is fired upon detection of a crash by a crash sensor not shown in the drawings, ignition flashes are emitted from the small holes 18, and ignite the propellant, such as sodium nitride, filled inside the first combustion chamber 17a.

The partition wall 9 is provided with a plurality of communication holes 19 communicating the first combustion chamber 17a and the second combustion chamber 17b. Therefore, the combustion in the first combustion chamber 17a is substantially immediately transmitted to the second combustion chamber 17b which is also filled with the propellant. In this embodiment, the second combustion chamber 17b is separated into two parts, but it is purely optional, and does not substantially affect the operation of the present embodiment. The bottom plate 13 is provided with an annular boss 20 which retains the igniter, and the effective end of this igniter extends into the ignition pipe 10.

Figure 6:
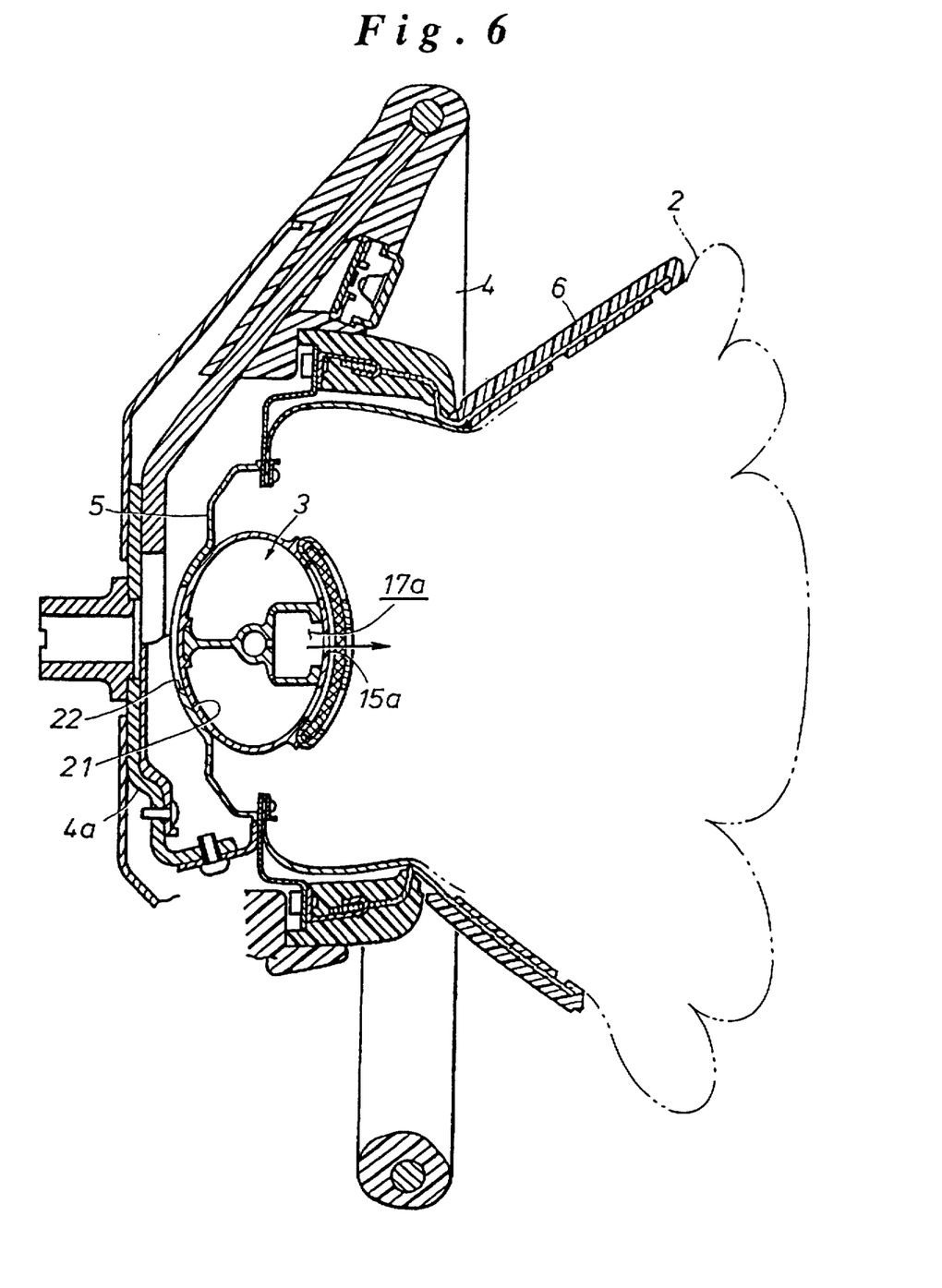
FIG. 6 is a view similar to FIG. 2 showing the air bag system in an early stage of air bag deployment.

Now the operation of this embodiment is described in the following with reference to FIGS. 5 to 8. The inflator 3 of this embodiment has a combustion chamber which is separated into two combustion chambers 17a and 17b. Initially, the propellant in the first chamber 17a is ignited, and the pressure inside the first combustion chamber 17a rapidly rises (the interval 0-T1 of FIG. 5). A part of the resulting combustion gas is blown into the air bag 2 via the circular gas ejection holes 15a, and this causes the air bag 2 to be slightly inflated, and the front wall of the casing 6 to be ruptured, as illustrated in FIG. 6. At this time point, the inflator 3 is still pushed against the bottom wall of the retainer 5 owing to the reaction to the ejection of gas from the gas ejection holes 15a, and the vent holes 22 formed in the retainer 5 is substantially closed by the inflator 3. As a result, the air bag 2 can be efficiently inflated without losing the gas by leakage.

Figure 7:
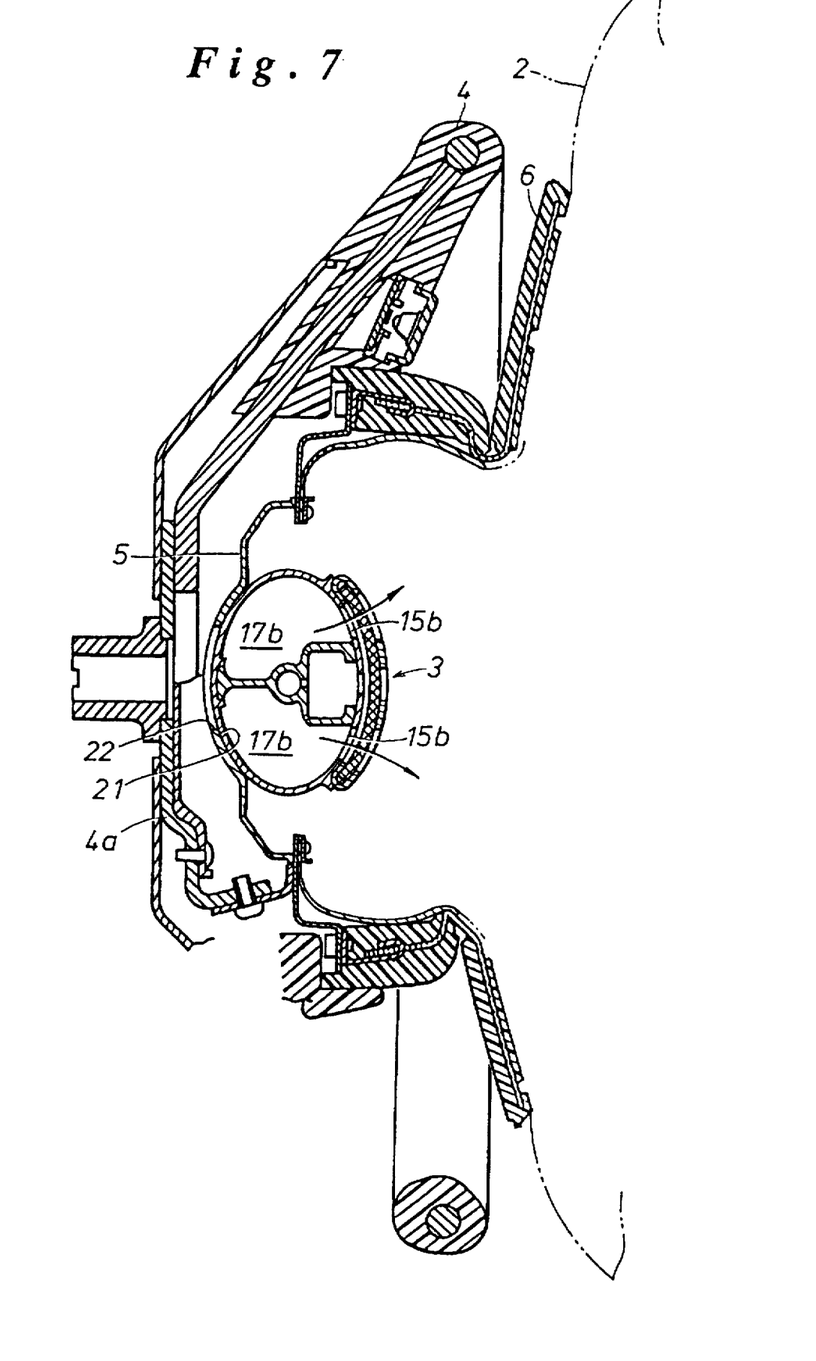
FIG. 7 is a view similar to FIG. 2 showing the air bag system in an intermediate stage of air bag deployment.

Once the casing 6 is ruptured, it causes the internal pressure of the first combustion chamber 17a to be reduced (the interval T1-T2 of FIG. 5), but the combustion of the propellant in the first combustion chamber 17a is transmitted to the second combustion chamber 17b via the communication holes 19, thereby igniting the propellant in the second combustion chambers 17b. This causes the pressure inside the second combustion chamber 17b to rise rapidly (the interval T3-T4 of FIG. 5), and a larger amount of gas to be introduced into the air bag 2 via the elongated gas ejection holes 15b with the result that the air bag 2 is rapidly and fully inflated, as illustrated in FIG. 7. The inflator 3 continues to be pushed against the bottom wall of the retainer 5 owing to the reaction to the ejection of gas from the gas ejection holes 15a and 15b. The propellant is eventually burnt up, and the inner pressure of the second combustion chamber 17b drops sharply (the interval T4-T5 of FIG. 5).

Figure 8:
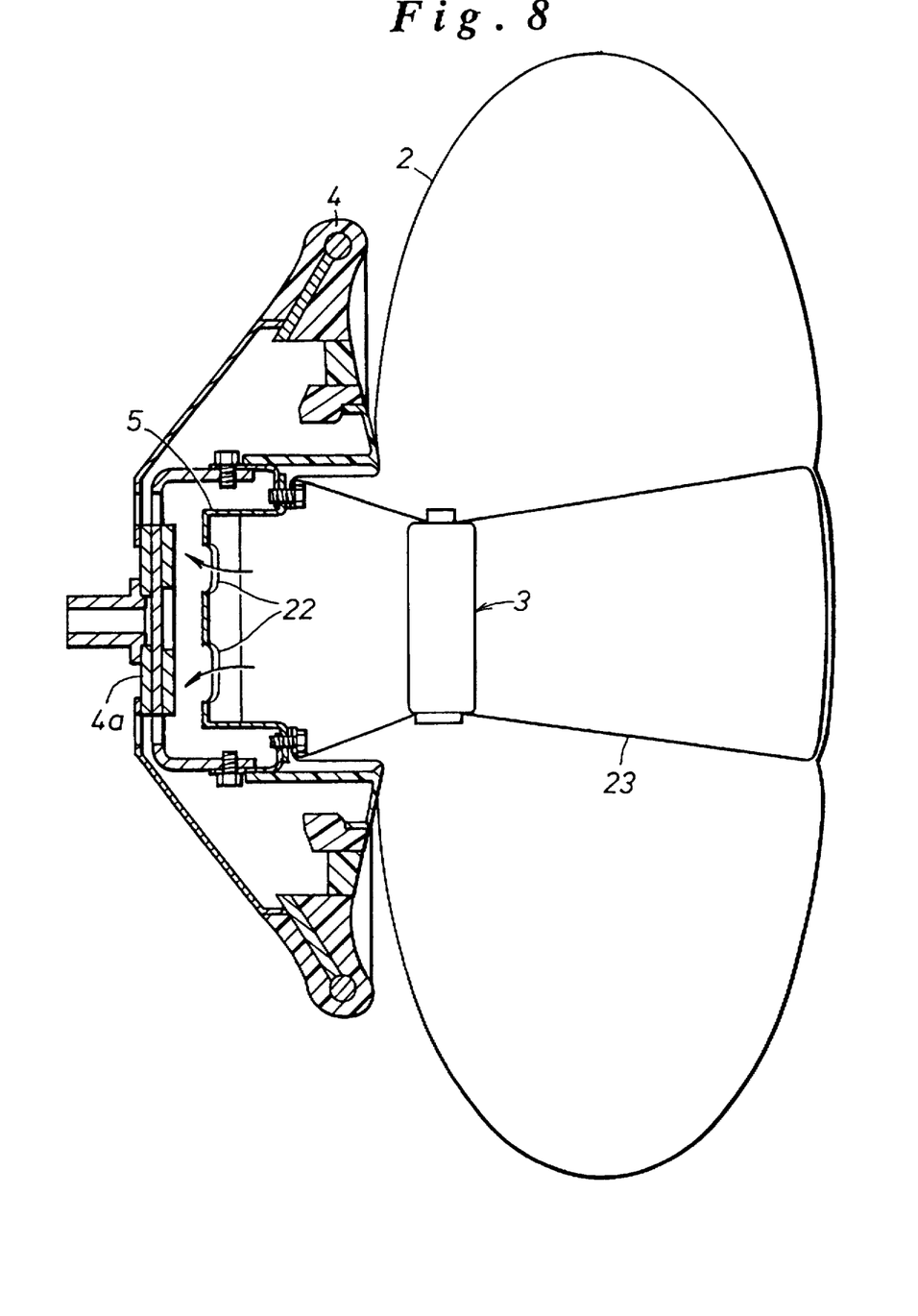
FIG. 8 is a view similar to FIG. 2 showing the air bag system in a fully deployed state.

Tie strings 23 are connected between front parts of the air bag 2 and the retainer 5, and the inflator 3 is attached to intermediate parts of these tie strings 23. Therefore, when the air bag 2 is inflated, the tie strings 23 are stretched as a result. This, in turn, causes the inflator 3 to be moved away from the retainer 5, thereby exposing the vent holes 22, as illustrated in FIG. 8. By this time, with all the propellant substantially fully spent, there is no retaining force applied to the inflator which could prevent the inflator 3 from being pulled away from the vent holes 22 by the tie strings 23.

After the air bag 2 is thus deployed, the vehicle occupant is typically thrown against the air bag 2 as a result of the rapid deceleration of the vehicle in a vehicle crash situation, thereby crushing the air bag 2. Because the gas inside the air bag 2 is allowed to be vented from the vent holes 22 at a controlled flow rate, the vehicle occupant is suitable restrained from being forcibly thrown forward, but would not be bounced back by the air bag 2.

As one can readily appreciate, because the steering wheel 4 is typically slanted from a vertical orientation, and the bottom wall of the retainer 5 is therefore similarly slanted, the inflator 3, which eventually falls down under gravitational force, would not close the vent holes 22 again. Thus, once the vehicle occupant is suitably restrained from being thrown forward by the air bag 2, the gas is vented from the air bag 2, and the air bag 2 is quickly deflated so as not to prevent the vehicle occupant from evacuating out of the vehicle.

Figure 9:
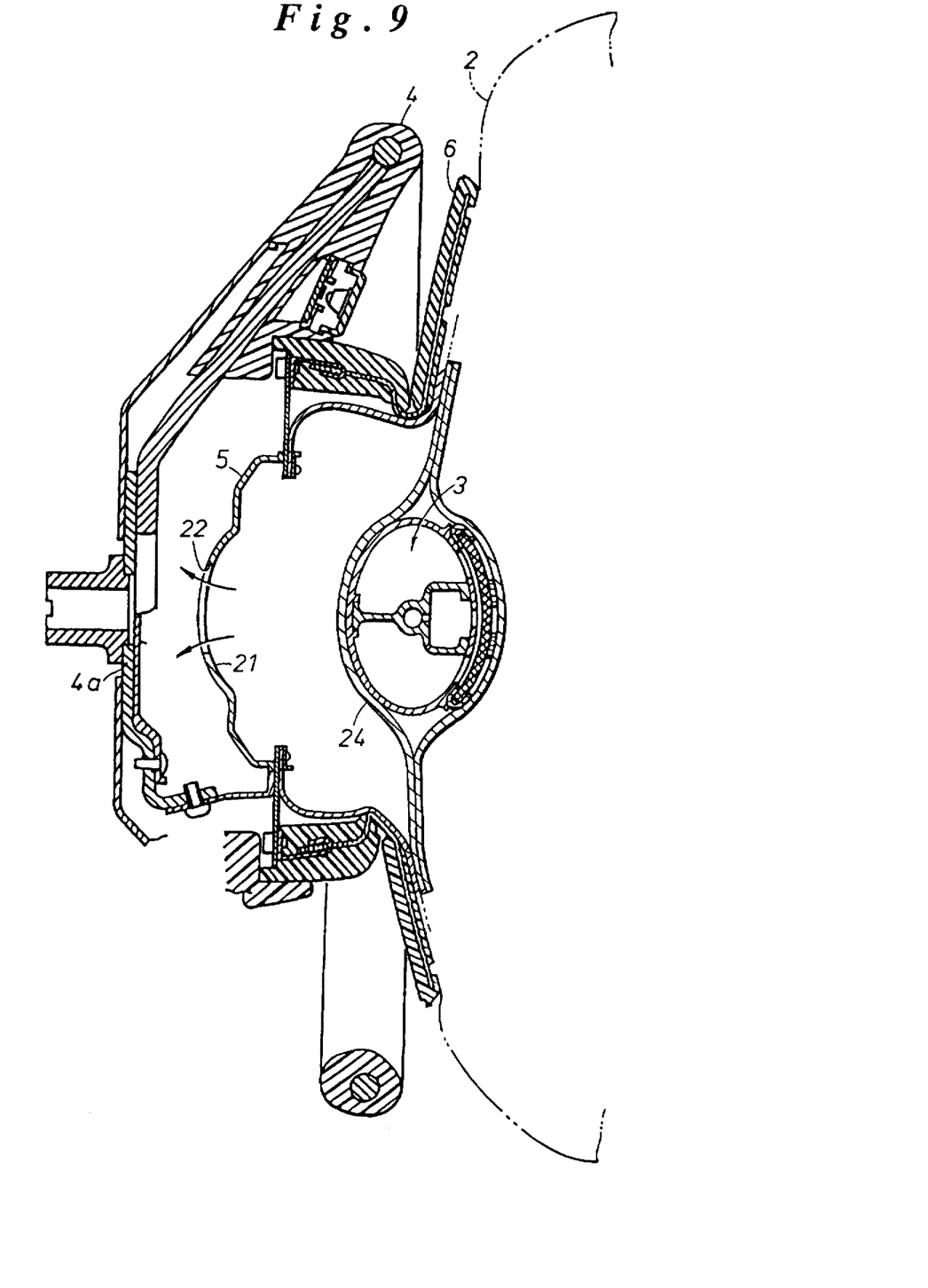
FIG. 9 is a view similar to FIG. 2 showing a second embodiment of the air bag system according to the present invention in a fully deployed state.

FIG. 9 shows a second embodiment of the present invention, in which the parts corresponding to the previous embodiment are denoted with like numerals. In this embodiment, the inflator 3 is received inside a bag 24 made of air-permeable, flexible and heat resistant sheet material, and is sewn to the inner surface of the air bag 2, instead of supporting the inflator 3 by tie strings 23. In this case also, the inflator 3 is initially pushed against the retainer 5 by the reaction resulting from the issuing of gas therefrom, but, as the air bag 2 is deployed, the inflator 3, which is attached to the inner surface of the air bag 2, is thrown off the retainer 5, thereby exposing the vent holes 22.

Figure 10:
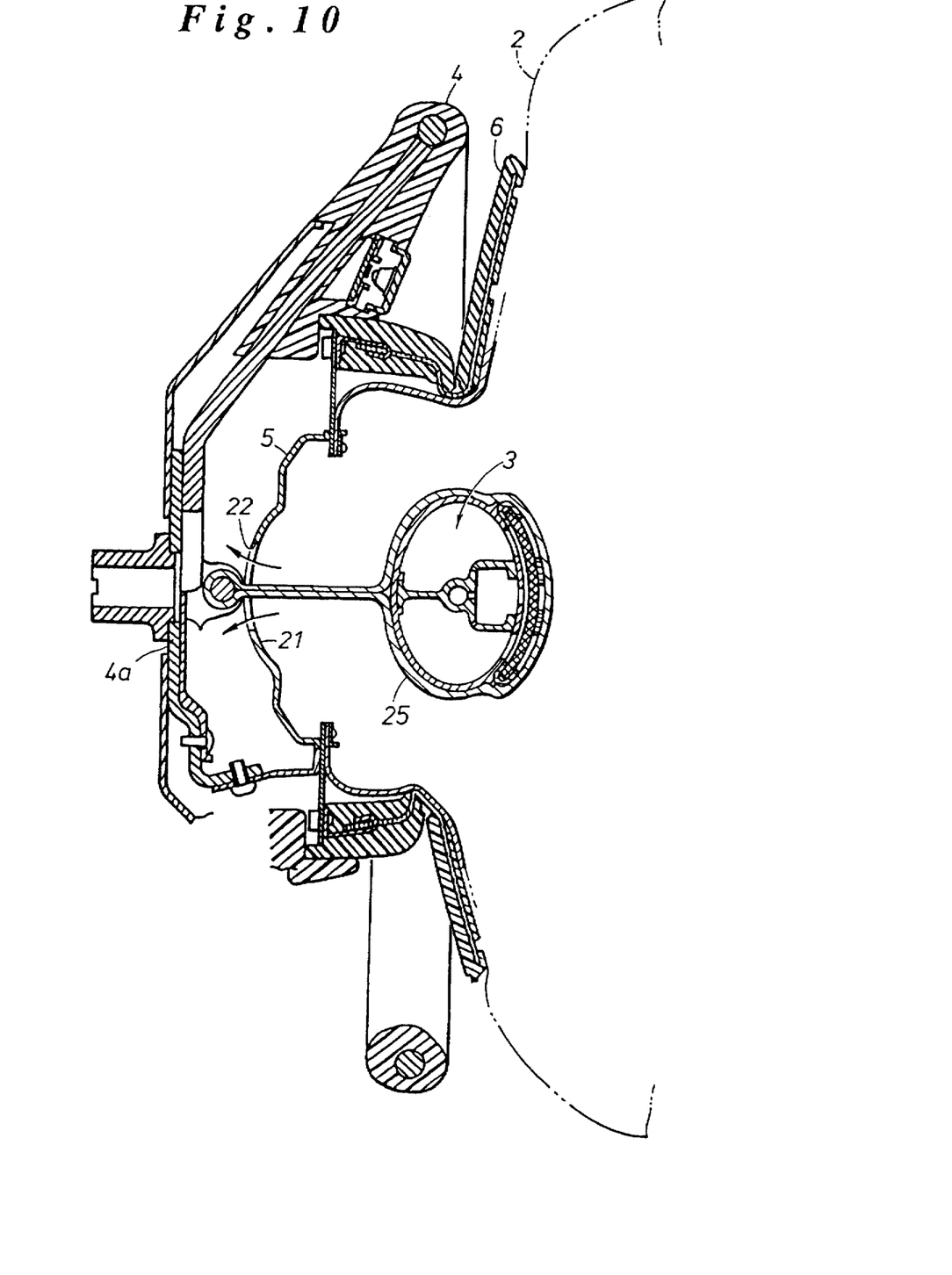
FIG. 10 is a view similar to FIG. 2 showing a third embodiment of the air bag system according to the present invention in a fully deployed state.

FIG. 10 shows a third embodiment of the present invention, in which the parts corresponding to the previous embodiments are denoted with like numerals. In this embodiment, the inflator 3 is similarly received in an air-permeable, flexible and heat resistant bag 25, and one end of the bag 25 is attached to the center hub 4a of the steering wheel 4. In this case also, the inflator 3 is initially pushed against the retainer 5 by the reaction resulting from the issuing of gas therefrom, but, as soon as the propellant in the inflator 3 is all spent, the inflator 3 becomes free, and drops off away from the retainer 21.

By receiving the inflator 3 in a flexible bag, and attaching the bag to a fixed part or to a part of the air bag, the arrangement for retaining the inflator 3 can be simplified. As one can readily appreciate, by attaching the inflator to a fixed part, such as a steering wheel hub, or to the air bag with a flexible member, such as a string, a belt, or a cord, not only the arrangement for retaining the inflator 3 can be simplified but also the inflator can be moved from a first position to close the vent holes and a second position for opening the vent holes in relation with the state of the deployment of the air bag 2.

Figure 11:
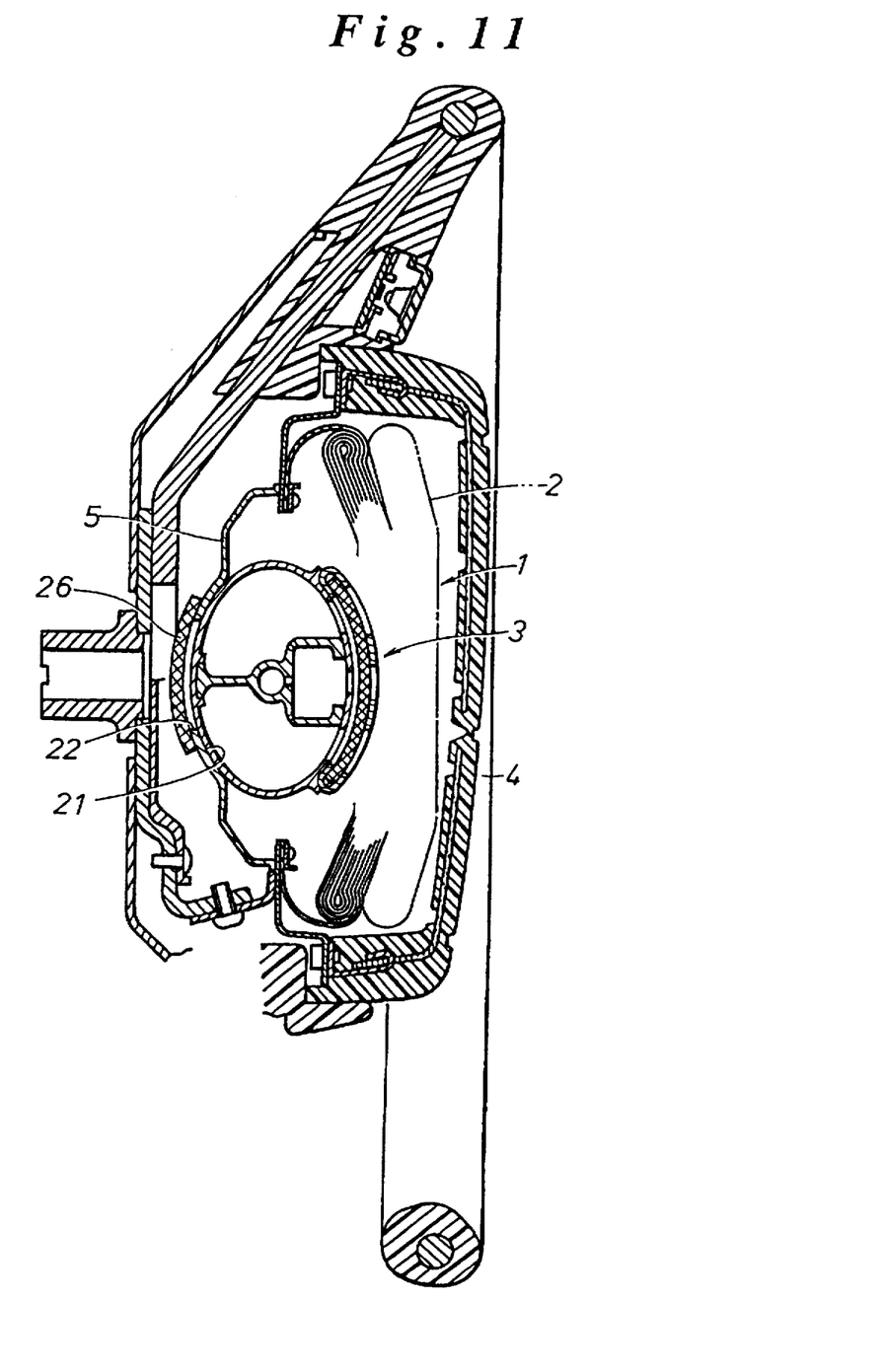
FIG. 11 is a view similar to FIG. 2 showing an embodiment which includes a filter placed over the vent holes.

If desired, as illustrated in FIG. 11, a filter 26 may be provided on the vent holes 22 so that any residues or other foreign matter, which may generate as a result of the combustion in the inflator 3, can be prevented from passing through the vent holes 22 when the inflator 3 is thrown away from the vent holes 22 during the process of deploying the air bag 2. The provision of the filter 26 on the vent holes 22 allows the filter assembly 8 for the inflator 3 to be simplified, and this, in turn, allows the size and weight of the inflator 3 to be reduced.

Although the present invention has been described in terms of the specific embodiments thereof, it obvious for a person skilled in the art that various modifications and alterations can be made without departing from the spirit of the present invention.

What we claim is:

1. A vehicle air bag system for restraining a vehicle occupant under a high deceleration situation, comprising:

an air bag adapted to be inflated by a gas pressure produced by combustion of a propellant;

a retainer for supporting said air bag, said retainer defining an enclosed space jointly with said air bag, and provided with a vent hole for communicating said enclosed space with outside;

an inflator received in said enclosed space for producing gas for inflating and deploying said air bag;

said inflator being disposed over said vent hole so as to substantially close said vent hole, and means, including said gas produced by said inflator, to maintain said inflator over said vent hole; and said inflator being moved away from said vent hole at a relatively late stage of air bag deployment when gas pressure in said inflator is reduced upon depletion of said propellant.

2. A vehicle air bag system according to claim 1, wherein tie strings are connected between parts of said air bag and said retainer, and said inflator is attached to said tie strings.

3. A vehicle air bag system according to claim 1, wherein said inflator is received in an air-permeable, flexible bag, and is attached to said retainer via said flexible bag.

4. A vehicle air bag system according to claim 1, wherein said inflator is attached to said retainer via a flexible member.

5. A vehicle air bag system according to claim 1, wherein said inflator is received in an air-permeable, flexible bag, and is attached to a part of said air bag via said flexible bag.

6. A vehicle air bag system according to claim 1, wherein said vent hole is provided with a filter.

7. A vehicle air bag system for restraining a vehicle occupant under a high deceleration situation, comprising:

an air bag adapted to be inflated by gas pressure;

a retainer for supporting said air bag, said retainer defining an enclosed space jointly with said air bag, and provided with a vent hole for communicating said enclosed space with outside;

an inflator received in said enclosed space for producing gas for inflating and deploying said air bag;

means for disposing said inflator over said vent hole so as to substantially close said vent hole;

means for removing said inflator away from said vent hole at a relatively late stage of air bag deployment; and said inflator being received in an air-permeable, flexible bag, and attached to said retainer via said flexible bag.

8. A vehicle air bag system for restraining a vehicle occupant under a high deceleration situation, comprising:

an air bag adapted to be inflated by gas pressure;

a retainer for supporting said air bag, said retainer defining an enclosed space jointly with said air bag, and provided with a vent hole for communicating said enclosed space with outside;

an inflator received in said enclosed space for producing gas for inflating and deploying said air bag;

means for disposing said inflator over said vent hole so as to substantially close said vent hole;

means for removing said inflator away from said vent hole at a relatively late stage of air bag deployment; and said inflator being pushed against said vent hole by interposing said air bag in a folded state between said inflator and a casing covering said folded air bag.

9. A vehicle air bag system according to claim 8, wherein said casing is provided with a rupture line which is adapted to rupture at a relatively early stage of air bag deployment.

10. A vehicle air bag system for restraining a vehicle occupant under a high deceleration situation, comprising:

an air bag adapted to be inflated by gas pressure produced by combustion of a propellant;

a retainer for supporting said air bag, said retainer defining an enclosed space jointly with said air bag, and being provided with a vent hole for communicating said enclosed space with outside;

an inflator received in said enclosed space for producing gas for inflating and deploying said air bag;

said inflator being disposed over said vent hole so as to substantially close said vent hole, and means, including said a produced by said inflator, to maintain said inflator over said vent hole; and means connecting said inflator air bag and being operative for removing said inflator away from said vent hole at a relatively late stage of air bag deployment when gas pressure in said inflator is reduced upon depletion of said propellant.

11. A vehicle air bag system according to claim 10 wherein said connecting means comprises tie string connected between said air bag and said retainer, said inflator being secured to said tie strings at an intermediate location thereof.

12. A vehicle air bag system according to claim 10 wherein said connecting means comprises an air permeable, flexible bag enclosing said inflator and securing said inflator to said air bag.

* * * * *